Aug. 18, 1953 L. ZAIGER ET AL 2,649,562
CONTROL SYSTEM FOR WINDSHIELD WIPERS
Filed Nov. 1, 1950
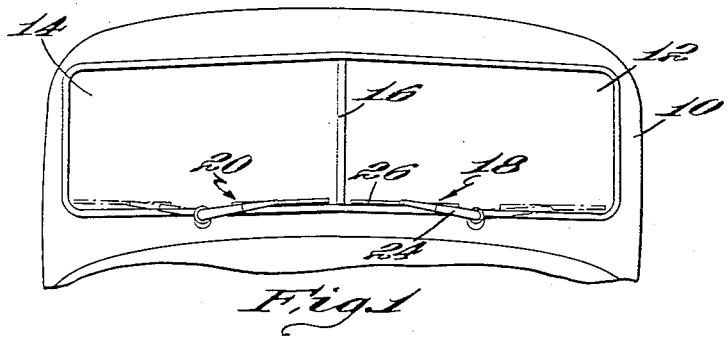
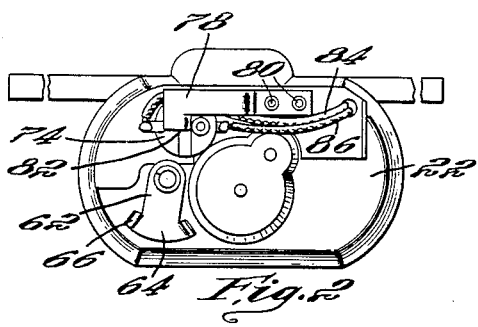
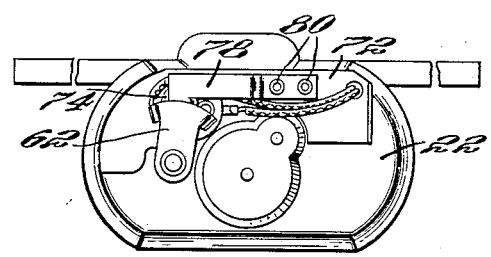
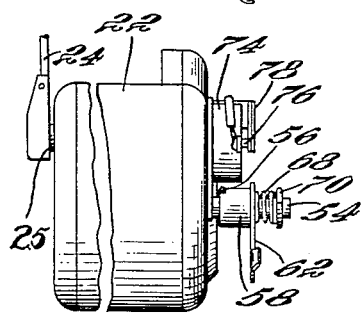
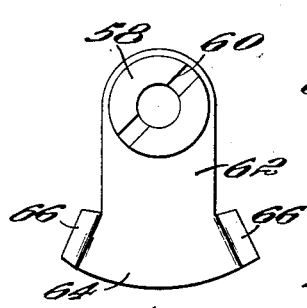
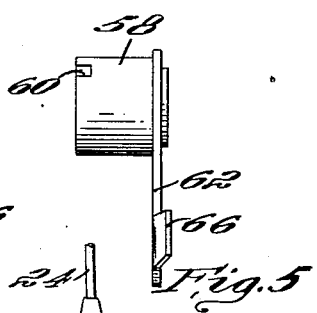
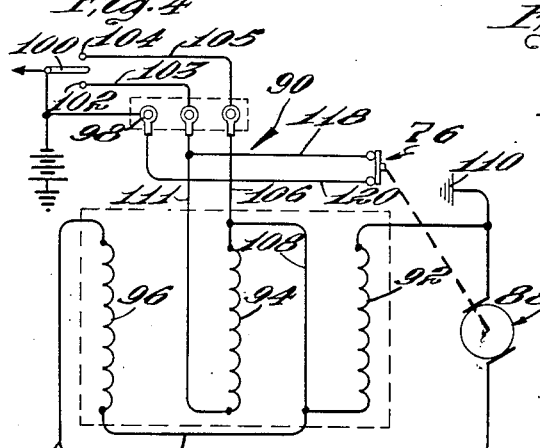
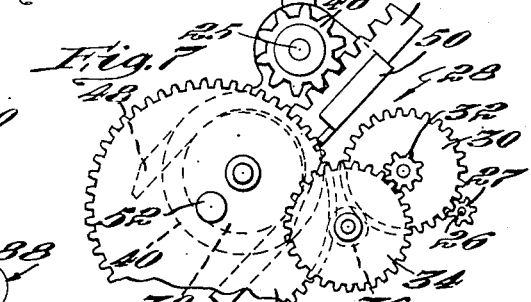
Inventors
Louis Zaiger
Robert I. Lappin
by Robert Cushman & Grove
Att'ys.

Patented Aug. 18, 1953

2,649,562

UNITED STATES PATENT OFFICE 2,649,562

CONTROL SYSTEM FOR WINDSHIELD WIPERS

Louis Zaiger, Swampscott, and Robert I. Lappin, Marblehead, Mass.

Application November 1, 1950, Serial No. 193,374

3 Claims. (Cl. 318—466)

This invention relates to windshield wipers of the kind disclosed in my pending application Serial No. 129,989, filed November 29, 1949, now Patent No. 2,559,208, and more especially to improvements in its design, optionally to bring the wiper blade to a parked or at-rest position at either end of its sweep or oscillation regardless of the position of the wiper blade at the time the main operating switch is turned off.

The conventional vacuum dual wiper and many single wipers have incorporated in their mechanism an automatic means for moving the blade to a parked position at the bottom or side of the windshield so as to be out of the line of sight of the operator when the wiper is turned off regardless of the position at which the blade may be at the time it is turned off. About half of the vacuum wipers now on the market park the blade at the left-hand side of the driver and the other half at the right-hand side of the driver. In making an electric wiper of universal design it is essential to provide a construction in which the blade may be parked at either side of the windshield depending upon the type of installation furnished as original equipment and in which there is means for quickly changing it from one side to the other without the use of tools.

As herein illustrated, the electric wiper includes an electric motor, a wiper blade and kinematic means operably connecting the motor to the blade for effecting oscillation thereof. In accordance with the invention there is a main starting and stopping switch for the electric motor and means for maintaining the operation of the motor following movement of the main switch to stopping position for a period of time sufficient to effect movement of the blade to an end of its path of oscillation and then to bring it to rest optionally at either end of its path independently of the main starting and stopping switch. The foregoing means includes a secondary parking switch and an actuating arm therefor interposed in the kinematic drive and operable thereby, the latter being shiftable so as to take effect at either of two points 180° apart, the two points being selected to coincide with the ends of the sweep of the blade. More specifically, the motor circuit has a high speed part and a low speed part, either of which may be closed by the aforementioned main switch, and in the lower speed side of the circuit there is the parking switch which normally holds the low speed side of the circuit closed so that the motor continues to operate after the main switch has been moved to its off position. The parking switch is, however, arranged to be opened by the aforesaid actuating arm when the blade reaches either end of its oscillation, the latter rotating continuously during the operation of the motor and moving by the parking switch once each 360° of rotation thereof.

The invention will now be described in greater detail with reference to the accompanying drawings wherein:

Fig. 1 is a front elevation of the tonneau of an automobile showing the windshields with the wiper blades parked inwardly toward the center of the windshield;

Fig. 2 is a plan view in elevation of the wiper motor showing the parking switch and the switch arm located so that the blade is parked inwardly;

Fig. 3 is a corresponding view of the wiper motor showing the parking switch and the switch arm located 180° from that shown in Fig. 2 so that the blade is parked outwardly;

Fig. 4 is a side elevation of the wiper motor showing the parking elements mounted thereon;

Fig. 5 is an enlarged plan view of the parking switch arm;

Fig. 6 is a side view of the parking switch arm shown in Fig. 5;

Fig. 7 is a plan view of the kinematic means connecting the motor shaft to the wiper shaft; and Fig. 8 is a wiring diagram of the motor circuit including the main and parking switches.

Referring to the drawings, there is shown in Fig. 1 the upper portion of the tonneau 10 of a motor vehicle in which are situated right and left-hand windshield sections divided by a vertical stanchion 16, each of which has mounted at its lower edge a windshield wiper 18 and 20 for clearing the windshield of water or snow. While the windshield wipers are shown as located at the lower edges of the windshield sections, it is obvious that they may be mounted at the upper edges or at the ends of the windshield and that the windshield may be continuous all the way across.

Each windshield wiper includes a motor housing 22 (Figs. 2 to 4) which may be fastened by appropriate means to the tonneau surrounding the windshield, and has a wiper arm 24 to which is attached a wiper blade 26. As illustrated in Fig. 7, the wiper arm 24 is fastened to a wiper shaft 25 which is connetcted in turn for oscillation to the drive shaft 29 of an electric motor mounted in the housing 22 by kinematic means 28. The kinematic means 28 includes a gear 27 keyed to the motor shaft which meshes with a gear 30, a gear 32 attached to the gear 30 which meshes with a gear 34, a gear 36 attached to the gear 34 which meshes with a gear 38, an eccentric 39 fastened to the gear 38, a collar 40 surrounding the eccentric and having integral therewith a rack 44, the teeth of which mesh with a gear 46 fastened to the shaft 25. A fork 48 also surrounds the eccentric 39 and has a guide 50 attached thereto for holding the rack in engagement with the gear 46, as described in the foregoing pending application. The gear 38 turns about the axis of a shaft 52 journaled in appropriate bearings in the housing and in accordance with this invention, the shaft 52 has an extension 54 projecting through the back side of the housing 22 (Fig. 4). A pin 56 is inserted through the extension shaft 54 diametrically thereof close to the point at which it emerges from the casing and there is placed on the extension shaft a sleeve or hub 58 having in one end diametrically arranged slots 60—60 for engagement with the ends of the pin 56, so that rotation of the shaft 52 is imparted to the hub through interengagement of the ends of the pin with the slot. The outer end of the hub 58 (Fig. 6) has fastened thereto a switch arm 62 which extends radially therefrom and has at its outer extremity an arcuate portion 64 (Fig. 6) terminating at opposite edges in inclined lips 66—66. To hold the slotted end of the hub in engagement with the ends of the pin and hence fast to the shaft extension, a coiled spring 68 (Fig. 4) is placed on the shaft extension between the outer end of the hub, and a split ring 70 mounted in an annular groove at the end of the shaft. As thus constructed, by grasping the hub 58 and pulling it against the spring, the slots may be disengaged from the pin and the hub may be rotated so as to move the switch arm 62 from the position shown in Fig. 2 through 180° to the position shown in Fig. 3 or vice versa. The gear 38 is the last element in the drive from the motor to the oscillating wiper arm which rotates continuously about a fixed center and since the shaft extension 54 is part of the shaft of this gear, the switch arm rotates continuously in one direction during operation of the motor.

The switch arm 62 is adapted in one position to cause the wiper arm 18 to come to a parked position at one side of the windshield and in its other position to cause it to come to a parked position at the opposite side of the windshield. To this end there is fastened to the rear side of the casing 22 (Figs. 2, 3 and 4) a plate 72 on which there is mounted a microswitch 74, hereinafter to be called a parking switch, having a switch element 76 (Fig. 4) extending therefrom. A resilient blade 78 overlies the switch element 76 and is fastened at one end by means of rivets 80 to the plate 72. Downward deflection of the free end of the blade serves to depress the element 76 and hence to open the motor circuit as will be described hereinafter, so as to stop the wiper motor. Normally the free end of the blade 78 springs out of contact with the switch element 76 by reason of its own resilience so that the circuit remains closed except when the blade is pressed down by the switch arm 62. The free end of the blade has an inclined lip 82 (Fig. 2) located in the path of rotation of the arcuate end portion 64 of the switch arm 62 so that the arcuate end of the arm will ride over the blade without danger of catching, and the latter will be depressed thereby once during each 360° of rotation of the arm 62. It is evident by using this construction that depression of the blade 78 may be made to take place at two different points in the oscillation of the wiper arm, which are 180° apart, that is by shifting the arm through 180° to engage the slots 60 with the ends of the pin 56 in either one of its two possible positions. By selecting the positions of depression and hence opening of the motor circuit so that the motor is stopped when the wiper arm is at one or the other end of its stroke, the wiper may be stopped in an out-of-the-way position regardless of the position at which the wiper motor is turned off and optionally at the right or left-hand side of the driver in accordance with the type of equipment with which it is used. This, it is evident, can be done quickly and easily without need for special tools and without modification of the wiper equipment. Thus the present wiper motor and operating elements may be used with existing wiper equipment regardless of whether it is designed to come to rest at the right or left-hand side of the windshield.

To effect the foregoing, the motor circuit shown in Fig. 8 is employed. As illustrated, the motor armature 88 and field winding 90, which includes coils 92, 94 and 96, are connected to the automobile battery through a battery terminal 98, by means of a main starting and stopping switch arm 100 having contacts 102 and 104 which alternatively are engageable with the contacts to complete the circuit from the battery to the motor for high or low speed operation thereof. At off position the switch arm 100 is disengaged from the contacts 102 and 104 so as to be in neutral position. When the switch arm 100 closes the contact 104, the high speed circuit is established so that current from the battery passes through the switch arm 100, terminal 104, conductors 105, 106 and 108, and coil 92 to the ground 110 and through the conductor 112, coil 96, conductor 114, armature 88 and to the ground 110. With the main switch arm 100 moved to close the contact 102, the low speed circuit is established so that the current passes from the battery through the switch arm 100, terminal 102, through conductors 103, 111, coil 94, conductor 108, coil 92 and to the ground 110, and through the conductor 112, coil 96, and conductor 114 to armature 88 and ground 110. Thus the motor and hence the wiper may be run at two speeds, that is a high speed and a low speed. When the switch arm 100 is moved to disengage both the contacts 102 and 104 it will be in a neutral position and normally open except for the provision of a secondary switch hereinafter referred so as the parking switch and which was described above as the switch 76.

In order to bring the wiper to rest at the proper position after the main switch 100 has been opened, that is at one or the other end of the path of oscillation of the wiper, the parking switch 76 is connected by means of conductors 118 and 120 to the conductor 111 and to the battery terminal 98 and hence to the low side of the circuit. The parking switch 76 is normally closed so that when the motor is running at high or low speed it has no effect on the circuit. When the main switch arm 100 is moved to neutral position, however, the parking switch 76 remains closed unless the former happens to be at stop position just as the switch arm 62 engages the parking switch 76, whereupon it will come to rest. Otherwise it will remain closed until actuated by the switch arm 62 and hence the wiper motor will continue to rotate after the main switch is opened until the switch arm moves a sufficient distance to depress the blade 78. As soon as the blade 78 is depressed and the parking switch 76 opened the motor will come to rest and the wiper arm will come to rest at an out-of-the-way position.

While the motor normally tends to overrun to some extent after the parking switch is actuated, and hence to carry the wiper beyond its at-rest position, this is in large part nullified by the fact that the kinematic mechanism for imparting oscillation to the blade arm includes the rack bar 44 which turns the gear 46 for producing oscillation of the wiper arm, and that the points of bringing the wiper to rest correspond with the opposite extremities of the movement of the rack bar where a very considerable angular movement of the gear 38 and eccentric 39 which drives the rack, takes place with very little movement of the rack. Accordingly, the motor may overrun without causing the wiper to travel an appreciable distance from its at-rest position. To prevent the over-travel of the motor from carrying the switch arm 62 out of contact with the switch operating blade 78 before it comes to rest, the arcuate end portion 64 is made large enough so that even though the shaft 52 rotates several degrees beyond the position at which the circuit is interrupted, it will remain in contact with the switch and hence insure permanent stoppage. Finally, by locating the parking switch on the low speed side of the circuit, the motor has less momentum and will come to rest much sooner than it would if it were connected to the high speed side of the circuit.

In operation of the device the wiper or wipers are started by moving the main switch arm 100 to either high or low speed. When the wiper is to be turned off the operator moves the main switch to an off or neutral position, that is to disengage it from either the high or the low side of the circuit. The motor continues to operate, however, due to the fact that the parking switch 76 holds the circuit closed regardless of the position of the main switch until the parking switch 76 is positively opened by the switch arm 62. The switch arm 62 is of course rotating continually and the first time it comes in contact with the parking switch 76 it will open the motor circuit to stop the motor. By rotating the switch arm 62 as heretofore described so that the parking switch will be opened at a point in the rotation of the motor shaft when the wiper arm is either to the right or left of the windshield, the windshield wiper may always be stopped in an out-of-the-way position.

The fact that the wiper may be caused to stop at either end of its stroke by shifting the position of the switch arm 60 through 180° without the use of tools, adapts the wiper for use with wiper equipment already installed, whether it is designed so that the wiper normally comes to a parked position on the left or right-hand side of the driver.

It should be understood that the present disclosure is for the purpose of illustration only and that this invention includes all modifications and equivalents which fall within the scope of the appended claims.

We claim:

1. In a windshield wiper, an electric motor, a mechanism including a constantly rotating shaft for effecting oscillation of the wipers, a circuit including switches operatble to initiate and stop oscillation of the wiper blades at one extremity of their oscillation, and means manipulatably operable to condition the circuit prior to installation alternatively for a right or left-hand installation.

2. In a windshield wiper, an electric motor, a mechanism including a constantly rotating shaft for effecting oscillation of the wipers, a circuit including manually and automatically operable switches, said circuit supplying current to the motor as long as the manually operable switch is closed and means making and breaking the automatically operable switch, said means being operative to interrupt the circuit only when the manual switch is open, said means comprising a making and breaking contact and a contact closing arm fast to said rotating shaft having a portion thereof adapted to move in a closed path and at a predetermined point in the path to close the switch, said contact closing arm being characterized in that its position may be changed with reference to its axis of rotation so that it may selectively be positioned to open the circuit at either extremity of the wiper oscillation.

3. A windshield wiper according to claim 1, wherein said contact closing arm has a hub pierced to receive the shaft and a diametrically located slot at one end thereof, a pin is made fast to said shaft diametrically thereof with which the slot in the hub is adapted to be engaged to hold the arm fast on the shaft and yieldable means is mounted on the shaft adjacent the hub for urging the latter axially in a direction to hold the slot and pin engaged, said hub being movable axially of the shaft against the yieldable means to disengage the slot from the pin without removing the arm from the shaft and rotatable on the shaft to reengage the slot with the pin at a position 180° from its first position.

LOUIS ZAIGER.
ROBERT I. LAPPIN.

References Cited in the file of this patent

UNITED STATES PATENTS

| Number | Name | Date |
| --- | --- | --- |
| 1,445,853 | Shaw | Feb. 20, 1923 |
| 2,259,790 | Auten | Oct. 21, 1941 |
| 2,357,152 | Whitted | Aug. 29, 1944 |
| 2,464,847 | Coffey | Mar. 22, 1949 |
| 2,499,298 | Christensen | Feb. 28, 1950 |